US005888625A

United States Patent [19]

Kobayashi et al.

[11] Patent Number: 5,888,625

[45] Date of Patent: Mar. 30, 1999

[54] IMAGE RECORDING PAPER

[75] Inventors: Tomoo Kobayashi; Kaoru Torikoshi, both of Minami-ashigara; Tadakazu Ezure, Ashigarakami-gun, all of Japan

[73] Assignee: Fuji Xerox Co., Ltd., Tokyo, Japan

[21] Appl. No.: 751,987

[22] Filed: Nov. 19, 1996

[30] Foreign Application Priority Data

Nov. 22, 1995 [JP] Japan .................................... 7-304262
Nov. 7, 1996 [JP] Japan .................................... 8-295562

[51] Int. Cl.$^6$ ........................................................ B32B 3/00

[52] U.S. Cl. ....................... 428/195; 428/405; 428/537.5; 427/195

[58] Field of Search ................................ 428/195, 411.1, 428/537.5, 405; 427/195

[56] References Cited

U.S. PATENT DOCUMENTS

| | | |
|---|---|---|
| 4,962,080 | 10/1990 | Watanabe . |
| 5,098,883 | 3/1992 | Aono . |
| 5,300,476 | 4/1994 | Kubodera et al. . |

FOREIGN PATENT DOCUMENTS

| | | |
|---|---|---|
| 0 261 970 | 3/1988 | European Pat. Off. . |
| A-2-55195 | 2/1990 | Japan . |
| A-5-216376 | 8/1993 | Japan . |
| A-6-219068 | 8/1994 | Japan . |

*Primary Examiner*—Elizabeth Evans
*Attorney, Agent, or Firm*—Oliff & Berridge, PLC

[57] ABSTRACT

An image recording paper has a recording surface comprised of a film obtained by the steps of coating or impregnating a substrate comprised primarily of a pulp fiber with a liquid composition comprising a silicone compound and a finely divided material, which silicone compound is capable of combining with the substrate and with the finely divided material by a chemical reaction, and drying the coated or impregnated liquid composition. The liquid composition preferably contains besides the silicone compound a modified-silicone oil having in a molecule thereof a reactive group. This image recording paper eliminates a conflict between fixability and releasablilty of an image forming material and is easily reusable without altering the appearance of plain paper.

19 Claims, No Drawings

IMAGE RECORDING PAPER

BACKGROUND OF THE INVENTION

1. Field of the Invention

The present invention relates to a reusable image recording paper which is used in an image forming apparatus based on an electrophotographic process or a thermal transfer process and more particularly to a reusable image recording paper which withstands repetitions of a cycle consisting of image formation with an image forming material and removal of the image either by use of an image removing apparatus destined for the removal from substrate of the image forming material fixed thereto by an image forming apparatus or by use of an image forming apparatus equipped with such an image removing device.

2. Description of the Related Art

Recently, because of the emergence of the problem of environmental pollution on a global scale, the importance of the protection of forest resources has been recognized with the result that the reduction in the consumption of wood resource as a material for paper has become important. As part of the measure for reducing the consumption, the reuse as waste paper of used paper is advocated instead of disposing it as a waste. Although the reuse of waste paper is an important recovery of resources, reuse of paper involves many problems.

For example, as regards the recovery of waste paper, particularly in business companies, the problems raised include leak of secret documents or data, different recovery operations according to the kinds of paper, transportation of paper and locations and controls of waste paper collecting places. In addition, since repulping treatment of waste paper shortens the pulp fibers, the quality of the regenerated paper tends to become inferior. And, a de-inking apparatus for de-inking treatment of existing images become necessary. Further, since a paper making machine itself is gigantic, complicated and expensive, the paper reuse work is intractable by any individual and is only manageable by a limited number of enterprises.

Unless the above-mentioned discriminate recovery, transportation, collection, operation of gigantic equipment and the like are conducted in an efficient way, a large amount of energy will be consumed (i.e., increase in $CO_2$ emission) and as a result the problem of global warming phenomenon which is one of global environmental problems and which ensues from the increase in the amount of $CO_2$ will be exasperated.

As one of the solutions to the above-mentioned problems, there have been proposed methods whereby an image on a sheet of paper once formed is erased so that the paper is used again. Exemplary of these methods are those described in the following laid open patent applications.

Japanese Patent Application Laid-Open (JP-A) No. 2-55195 provides a erasable printing substrate by coating an image support material made, for example, of plastics, metal, liquid-impermeable paper or ceramics, with a silicone sealing agent, i.e., a silicone rubber-based releasing agent. When removing an image, the image printed in a thermally fusible ink on the support is heated and pressed together with a thermally fusible release coating present therebetween and is then cooled down to remove the image from the support.

In this case, since the silicone sealing agent tends to migrate, it adheres to contact surfaces of paper feeder or delivery rollers and the like inside an apparatus to cause paper block up. In addition, the block up causes dust and toner to float inside the apparatus and to deposit on paper, thus smearing the paper. An attempt to form a thin and uniform coating layer of the silicone sealing agent on a substrate to reduce the migration of the silicone sealing agent has proved to be unsuccessful. This is because, where the substrate is simple paper, such factor as penetration of the silicone sealing agent into paper or irregularity on the surface of paper causes discontinuity of coating layer including uncoated areas. Accordingly, in order to fulfill the function as an erasable printing substrate, the film thickness of the silicone sealing agent needs to be at least Sum, which enhances the surface smoothness and results in poor fixability of image.

Besides, in the above-cited invention, utilized as a substrate is a material which is exemplified by polyethylene terephthalate (PET) or a laminated film and which usually has a surface smoothness of at least 300 seconds as measured by a Beck's smoothness meter. In the case where such a substrate is coated with a silicone sealing agent layer having a thickness of 3 um or more which is necessary for satisfactory removal of an thermally fusible ink, the fixability of image recording material is so poor that mere rubbing the image with hand will cause the image part to easily peel, thus resulting in unsatisfactory preservation of the record.

Japanese Patent Application Laid-Open (JP-A) No. 5-216376 provides an erasable printing paper having a recording surface coated with a releasing agent, which, when erasing the image, is press-contacted with a medium comprised of a material causing an easy offset so that the image forming toner will be transferred and removed. The releasing agents utilized include a silicone oil, a fluorinated oil and other aliphatic oils. When these oils are utilized, in order to obtain a satisfactory level of toner release property, it will be necessary to apply them to paper in such a large amount that the coated printing paper will become transparent. Therefore, the problems involved are that the obtained printing paper will present an appearance different from that of plain paper, that mere rubbing the image with hand causes the image part to easily peel due to poor fixability thus resulting in unsatisfactory preservation of the record and that migration tendency of the releasing agent presents the same problems as in the case of Japanese Patent Application Laid-Open (JP-A) No. 2-55195.

Japanese Patent Application Laid-Open (JP-A) No. 6-219068 provides a reusable printing paper obtained by coating or impregnating a thermal transfer recording paper with a thermally modifiable material which, when heated, becomes less adherent to an image forming material and which is exemplified by a fluorine-containing acrylate. In this case, the recording paper is a thermal transfer recording paper, which has a higher smoothness and poor fixability in comparison with plain paper. The above-mentioned thermally modifiable material has poor adhesion to the thermal transfer recording paper as a substrate and exhibits migration, which causes slip between paper delivery rollers and the recording paper thereby increasing the possibility of causing block up of recording paper and failure in setting due to deviation of location. Although there is described a technique consisting of creating on the thermal transfer printing paper a limited region where the thermally modifiable material is not coated or impregnated as a measure for the prevention of the above-mentioned problems, fresh problems will be more labor that will be involved, difficulty in the manufacture of the printing paper and higher production costs.

In addition, in the case of the above-mentioned reusable recording paper utilizing a thermally modifiable material, a fixing treatment by the application of pressure is necessary, which is disadvantageous from the viewpoint of wide use of this type of paper, because, in current copiers based on electrophotography, the fixation of an image forming material on a recording paper is performed by a thermal press. Other problems include that the writings by pencil, ball point pen, water base ink pen and the like are too light-colored to be discernible and that the surface is too repellent to write.

SUMMARY OF THE INVENTION

In view of the above-mentioned situation of the prior art, the present invention has been made to overcome the above-mentioned problems.

One object of the present invention is to provide an image recording paper which can be regenerated in situ by an ordinary person without relying on a person specialized in waste paper reuse and the appearance of which is not deviated from that of plain paper.

Another object of the present invention is to provide a reusable image recording paper which enables an excellent fixation of an image forming material to the recording paper and which also enables the removal of the image forming material from the recording paper without damaging its surface.

A further object of the present invention is to provide an image recording paper which facilitates the reuse of the recording paper in not only the case of monochrome image but also in the case of colored full solid image produced by an image forming apparatus based on an electrophotographic process or a thermal transfer process.

Yet another object of the present invention is to provide an image recording paper which exhibits no migration of a material having a release property and is free of the problems relating to the delivery of paper inside an apparatus.

A still further object of the present invention is to provide an image recording paper which is freed from the problem of migration of filler by securing the filler along with a material having a release property to the surface of the recording paper, whereas a filler that is present on the surface of paper, such as talc, tends to migrate to the surface of a photoreceptor to thereby cause a defective image in the case where an ordinary acidic paper is used in an image forming apparatus based on an electrophotography.

An additional object of the present invention is to provide an image recording paper which presents no problem to the writings by pencil, ball point pen, water base ink pen, oil base ink pen and the like.

After a series of studies about reusable recording paper, the present inventors have achieved the invention, based on the discovery that fixability and release of an image forming material become compatible with each other without damaging the surface of paper and that an easy reuse becomes possible even if a colored solid image is present on an entire surface of paper not to mention a monochrome image, by creating an image material-releasable coating film which directly combines by a chemical reaction with the pulp fiber surface of an ordinary recording paper and which secures therewithin a finely divided material by way of a chemical reaction.

Accordingly, the reusable recording paper according to the present invention comprises a substrate comprised primarily of a pulp fiber and a film thereon which is created by coating or impregnating the substrate with a liquid composition comprising a silicone compound and a finely divided material and thereafter drying the applied composition, wherein the silicone compound is capable of combining with the substrate and with the finely divided material by a chemical reaction.

Besides, the reusable recording paper of the present invention is one which has an appearance of plain paper.

The reusable recording paper is obtained by coating or impregnating a substrate comprised primarily of a pulp fiber with a liquid composition comprising a curable silicone compound and a finely divided material, which silicone compound is capable of directly combining with a surface OH group, i.e., OH group of cellulose as a main constituent of pulp fiber or OH group of the finely divided material, by a chemical reaction, and thereafter drying the coated or impregnated liquid composition. Because of this, the film component containing the curable silicone compound strongly adheres to the substrate and does not come off the substrate (pulp fiber) while functioning as a release providing coating to an image forming material. That is, the film component does not migrate. Accordingly, it not only facilitates the removal of the image forming material but also semipermanently exhibits its function in the reusable recording paper. Besides, owing to the finely divided material which makes it possible to control the surface irregularity of the film so that the amount of remnant image forming material at the time of removal of the image forming material is reduced, the performance of the film can be maintained for a long period of time.

DETAILED DESCRIPTION OF THE INVENTION

Detailed explanation of the reusable recording paper is given below.

Pulp usable in the present invention includes bleached kraft pulp of broadleaf tree, unbleached pulp of broadleaf tree, bleached sulfite pulp of broadleaf tree, bleached kraft pulp of needle-leaf tree, unbleached pulp of needle-leaf tree, bleached sulfite pulp of needle-leaf tree and soda pulp. And, a preferred pulp is a virgin, bleached chemical pulp which is produced by chemical treatment and subsequent bleach of pulp and fibrous material from wood or the like, and preferably the pulp has a higher level of whiteness.

Also usable is a waste paper pulp, which includes pulp from unprinted waste paper, for example, from cut-off, loss or edge-cut paper of such grade as topmost, special or medium white paper in a bookbinding, printing or cutting workshop and pulp from de-inked waste paper produced by the steps of breaking up inked papers including fine quality paper, fine quality coated paper, medium quality paper, medium quality coated paper or fancy-figured paper each printed by such process as lithography, letterpress, intaglio, electrophotography, heat-sensitive process, thermal transfer, pressure-sensitive process, ink-jet recording or carbon paper process, paper written with a water base or oil base ink pen or pencil and news paper and then de-inking the foregoing broken waste paper in a suitable manner specific to the type of waste paper to produce pulp therefrom. Among the pulp from de-inked waste paper, preferred is waste paper pulp derived from paper printed by lithography having a relatively easy de-inking property and particularly a pulp having a high-level whiteness and containing little impurities.

Owing to a surface layer, which is formed on the pulp fiber of an image recording paper produced from the above-described pulp to provide an excellent release of an image forming material and to react directly with cellulose as a main component of pulp, it becomes possible to prevent an excessive penetration of fused image forming material at the time of fixing treatment and thus it is possible to reduce the amount of remnant image forming material at the time of removal thereof. Besides, since the roughness of paper is not regular and since even seemingly regular roughness provides holes (void space) that allow an inward partial penetration of the fused image forming material at the time of fixing treatment, the image forming material may not be removed from the region corresponding to the foregoing holes, thus retaining the image forming material on the paper in the form of stain. However, it is possible to control the irregularity of roughness and fill the above-mentioned partial holes by use of a finely divided material, thereby controlling unnecessary penetration of the image forming material.

Generally, a finely divided material tends to reduce the specific surface area and tends to weaken the fixation of the image forming material to the recording paper. However, if a proper level of irregular roughness exists on the surface of recording paper, a sufficient level of fixability can be obtained. Since the surface irregular roughness varies depending on the types of recording paper, the level of fixing or release property is adjusted by selecting a liquid composition and a finely divided material.

The liquid composition, which will chemically react directly with pulp fiber and provide a substrate surface exhibiting a satisfactory release of an image forming material, contains a silicone compound and a finely divided material and preferably contains a modified silicone oil having a reactive group in its molecule as an additional ingredient. The silicone compound is a compound which can chemically combine with a substrate comprised primarily of a pulp fiber and with the above-mentioned finely divided material. A suitable silicone compound comprises at least one substance selected from the group consisting of a fluorine-containing silicone compound, an isocyanate silane compound, an alkoxysilane compound, a silane coupling agent a SiH-bearing silane compound. The above-mentioned silicone compound is preferably free of a reactive chlorine, because such a reactive chlorine will produce hydrochloric acid, which will damage the recording paper to the extent that the preservation or handling of paper becomes difficult.

A combined use of a silicone compound and a modified silicone oil having a reactive group introduced into its molecule is particularly desired in order to enhance the release of an image forming material and durability. A modified silicone oil having a reactive group introduced into its molecule means an organic silicone compound which has an oily state at room temperature and which has any group (e.g., a group having a reactive hydrogen) introduced into its molecule.

A suitable modified silicone oil having a reactive group for use herein is a substance comprising at least one silicone oil selected from the group consisting of a silanol-modified silicone oil, a carboxyl-modified silicone oil, an amino-modified silicone oil and a methylhydrogensilicone oil.

Exemplary of particularly suitable modified silicone oils are a silanol-modified silicone oil, a carboxyl-modified silicone oil, an amino-modified silicone oil and a methylhydrogensilicone oil. In addition, other examples of suitable modified silicones include an epoxy-modified silicone oil, a carbinol-modified silicone oil, a methacryl-modified silicone oil, a mercapto-modified silicone oil and a phenol-modified silicone oil, because many of the foregoing silicone oils are colorless and transparent and therefore pulp substrate will not be colored. Also suitable is a silicone oil having in a molecule thereof different reactive groups, e.g., a amino group and an alkoxy group. Other modified silicone oils will be satisfactory if they do not cause coloring or discoloration problems.

In the case where a combination of a modified silicone oil and a silicone compound is used, the ratio between them can vary depending on the purpose. However, the ratio of the modified silicone oil to the curable silicone compound is preferably in the range of 1–400 percent by weight. In the case where the amount of the modified silicone oil is too small, the release of the fixed image forming material will be difficult, whereas in the case where the amount of the modified silicone oil is too large, the probable problems include poor fixation of image forming material, tackiness of the substrate surface and transparent recording paper.

A recording paper is coated or impregnated with a liquid composition containing a silicone compound, and thereafter the layer is dried to produce a film having a release property. The silicone compound is highly reactive with a finely divided material, which is exemplified by talc, clay (kaolin), calcium carbonate, titanium oxide, aluminum oxide, aluminum sulfate, zirconium oxide, barium titanate, silica, a silicone resin, an acrylic resin, a styrene resin, a styrene/acrylic resin, a melamine resin, a benzoguanamine resin and a melamine/benzoguanamine resin, and is cured together with pulp fiber to secure the foregoing finely divided material within the recording paper.

Examples of silicone compounds are given below. Alkoxy silane compounds which may include part of SiH-bearing compounds are exemplified by $Si(OCH_3)_4$, $CH_3(SiOCH_3)_3$, $HSi(OCH_3)_3$, $(CH_3)_2(SiOCH_3)_2$, $CH_3HSi(OCH_3)_2$, $C_6H_5Si(OCH_3)_3$, $Si(OC_2H_5)_4$, $CH_3Si(OC_2H_5)_3$, $(CH_3)_2(SiOC_2H_5)_2$, $H_2Si(OCH_3)_2$, $C_6H_5Si(OC_2H_5)_3$, $(CH_3)_2CHCH_2SiOCH_3)_3$, $CH_3(CH_2)_5Si(OCH_3)_3$, $CH_3(CH_2)_7Si(OC_2H_5)_3$, $CH_3(CH_2)_{11}Si(OC_2H_5)_3$, $CH_3(CH_2)_{15}Si(OC_2H_5)_3$, $CH_3(CH_2)_{17}Si(OC_2H_5)_3$, hydrolysates thereof and partial condensates thereof. Among the foregoing alkoxy silanes, particularly preferred are those having three or more functional groups per molecule. Besides, a SiH-bearing silane compound is not included in the scope of the above enumerated compounds but is a silane compound having both a SiH group and a functional group.

Silane coupling agents are exemplified by a vinylsilane, which includes vinyltris(β-methoxyethoxy)silane, vinyltriethoxysilane and vinyltrimethoxysilane, an acrylsilane, which includes γ-methacryloxypropyltrimethoxysilane, an epoxysilane, which includes β-(3,4-epoxy-cyclohexyl) ethyltrimethoxysilane, γ-glycidoxypropyltrimethoxysilane and γ-glycidoxypropylmethyldiethoxysilane, and an aminosilane, which includes N-β-(aminoethyl)-γ-aminopropyltrimethoxysilane, N-β-(aminoethyl)-γ-aminopropylmethyldimethoxysilane, γ-aminopropyltriethoxysilane and N-phenyl-γ-aminopropyltrimethoxysilane. Among the foregoing silane coupling agents, particularly preferred are those having three or more functional groups per molecule.

Other examples of silane coupling agents include $HSC_3H_6Si(OCH)_3$, $ClC_3H_6Si(OCH)_3$, hydrolysates thereof and partial condensates thereof.

Isocyanate silane compounds are exemplified by $(CH_3)_3SiNCO$, $(CH_3)_2Si(NCO)_2$, $CH_3Si(NCO)_3$, vinylsilyltriisocyanate, $C_6H_5Si(NCO)_3$, $Si(NCO)_4$, $C_2H_5OSi(NCO)_3$, $C_8H_{17}Si(NCO)_3$, $C_{18}H_{37}Si(NCO)_3$ and $(NCO)_3SiC_2H_4Si(NCO)_3$. Among the foregoing isocyanate silanes, particularly preferred are those having three or more isocyanate functional groups per molecule.

As fluorine-containing silicone compounds, suitable for use herein are those fluorine-containing silicone compounds which contain a perfluoroalkyl in order to further enhance the release property. Examples of these compounds include $C_6F_{13}C_2H_4Si(OCH_3)_3$, $C_7F_{15}CONH(CH_2)_3Si(OC_2H_5)_3$, $C_8F_{17}C_2H_4Si(OCH_3)_3$, $C_8F_{17}C_2H_4SiCH_3(OCH_3)_2$, $C_8F_{17}C_2H_4Si(ON{=}C(CH_3)(C_2H_5))_3$, $C_9F_{19}C_2H_4Si(OCH_3)_3$, $C_9F_{19}C_2H_4Si(NCO)_3$, $(NCO)_3SiC_2H_4C_6F_{12}C_2H_4Si(NCO)_3$, $C_9F_{19}C_2H_4Si(C_2H_5)(OCH_3)_2$, $(CH_3O)_3SiC_2H_4C_8F_{16}C_2H_4Si(OCH_3)_3$, $(CH_3O)_2(CH_3)SiC_9F_{18}C_2H_4Si(CH_3)(CH_3O)_2$, hydrolysates thereof and partial condensates thereof. Among the foregoing fluorine-containing silicone compounds, particularly preferred are those having three or more methoxy or isocyanate functional groups per molecule.

The aforementioned liquid composition may contain silica gel or the like in addition to any of the above enumerated silicone compounds. Besides, in the present invention, it is preferred that a mixture of two or more of the above enumerated silicone compounds or partial condensates thereof be used rather than using them alone as a single compound.

In addition to the above-mentioned ingredients, the liquid composition for the formation of a substrate surface having an excellent release property may contain other materials such as an aluminum compound, a titanium compound, a zirconium compound a fluorine compound in an amount that will not impair the expected effect of the liquid composition. Specific examples of the foregoing compounds are as follow: aluminum isopropylate, aluminum sec-butylate, aluminum tert-butylate, tetraisopropyl titanate, tetra-n-butyl titanate, tetraisobutyl titanate, tetra-sec-butyl titanate, tetra-tert-butyl titanate, tetra-n-pentyl titanate, tetraisopentyl titanate, tetra-n-hexyl titanate, tetra-n-heptyl titanate, tetra-n-octyl titanate, tetraisooctyl titanate, tetra-n-nonyl titanate, tetramethyl zirconate, tetraethyl zirconate, tetraisopropyl zirconate, tetra-n-propyl zirconate, tetra-n-butyl zirconate, tetraisobutyl zirconate, tetra-tert-butyl zirconate, mono-sec-butoxyaluminum diisopropylate, ethylacetoacetatealuminum diisopropylate, di-n-butoxyaluminum monoetylacetoacetate, aluminum di-n-butoxide methylacetoacetate, aluminum diisobutoxide monomethylacetoacetate, aluminum di-sec-butoxide monoethylacetoacetate, aluminum diisopropoxide monoethylacetoacetate, aluminum trisacetylacetate, aluminum diisopropoxide monoacetylacetate, aluminum monoacetylacetonate bis (ethylacetoacetate), aluminum tris(ethylacetoacetate), a cyclic aluminumoxide acylate, diisopropoxytitan bis (acetylacetate), di-n-butoxytitan-bis(acetylaceonate), tetraoctyleneglycol titanate, and tetrakisacetylacetone zirconate.

Fluorine compounds are, for example, a fluoro-olefinic resin. More specifically, examples of these compounds include tetrafluoroethylene, chlorotrifluoroethylene, hexafluoropropylene and perfluoropropyl vinyl ether. These compounds may be used in a combination of two or more of them. In addition, these compounds are preferably copolymerized with other vinyl ether, such as ethyl vinyl ether and cyclohexyl vinyl ether, and a curing agent to be used as a copolymer. Further example of these compounds is a perfluoropolyether represented by $X{-}CF_2(OC_2F_4)_p(OCH_2)_qOCF_2{-}X$, which includes an isocyanate-modified compound having X indicating $OCN{-}C_6H_3(CH_3)NHCO{-}$, a carboxyl-modified compound having X indicating $-COOH$, an alcohol-modified compound having X indicating $-CH_2OH-$, $-CF_2-CH_2((OCH_2CH_2)_n)OH$ or the like and an ester-modified compound having X indicating $-COOR$.

The fixability and release propertiy of an image recording paper are influenced by such factors as surface condition of a substrate, selection of the composition of silicone compound, thickness of film on the substrate, amount of a finely divided material as calculated with respect to the amount of the silicone compound and average particle diameter of the finely divided material. The thickness of the film is preferably in the range of 0.05 to 5.0 μm, exclusive of the thickness of the finely divided material. In the case where the thickness of the film is less than 0.05 μm, it is difficult to secure the finely divided material to the substrate and the result is that the particles are exposed out of the substrate, whereas a film having a thickness greater than 5.0 μm undesirably smoothens the surface of the substrate to impart gloss to such an extent that the feel of plain paper is lost, even if the finely divided material has larger particle sizes.

The amount of finely divided material as calculated with respect to the amount of the silicone compound is preferably in the range of 1 to 100 parts by weight of the finely divided material per 100 parts by weight of the silicone compound, although the relationship varies depending on the composition of the silicone compound and the composition of the finely divided material. In the case where the amount of the finely divided material is less than 1 part by weight, localized holes on the paper are insufficiently filled, whereas it becomes difficult to secure the finely divided material to the substrate if the amount of the finely divided material exceeds 100 parts by weight. The average particle diameter of the finely divided material is preferably in the range of 0.1 to 15 μm and particularly in the range of 0.3 to 5.0 μm. In the case where the average diameter of the finely divided material is greater than 15 μm, feel by touch of the paper changes and an undesirable effect will appear on the image, whereas in the case where the average particle size of the finely divided material is smaller than 0.1 μm, the encountered problems are, for example, poor dispersion of the finely divided material in coating liquid due to coagulation of particles and difficulty in securing the finely divided material to the substrate due to resultant decrease in the amount of a silicone compound to be assigned to the reaction with substrate, because increase in the surface reaction site that accompanies the increase in specific surface area of particles will consume the silicone compound solely for the reaction with the finely divided material.

Methods for coating or impregnating a substrate with the above-mentioned liquid composition are ordinary methods and include a plate coating method, a Meyer bar coating method, a spray coating method, an immersion coating method, a bead coating method, an air knife coating method, a curtain coating method, a rod bar coating method and a roll coating method.

Drying of the substrate after coating or impregnation of the liquid composition may be performed by air-drying, but drying at an elevated temperature leads to an enhanced release of an image forming material. The enhanced release will perhaps be caused by orientation of the reaction product resulting from the reaction between the pulp substrate and an ingredient of the liquid composition. For drying at an elevated temperature, a number of methods are adopted which include placing the coated or impregnated substrate in an oven, passing it through an oven and contacting it with a heat roller.

As stated above, a method, by which an image forming material is removed from an image recording paper capable of releasing the image forming material, should be desirably the same as the method by which the image based on the image forming material is formed on the image recording paper, when viewed from a theoretical point. In a thermal transfer process or electrophotography, an image is formed on a recording paper by fixing an image forming material, for example, by applying heat to the paper. Heating again the once fixed image causes the image on the recording paper to melt and to become easily removable from the recording paper. Accordingly, an image forming apparatus, which has a fixing device that is also usable as an image removing device and therefore does not require a device exclusively for removal of image, provides the advantage of effectively utilizing the space, because such an image forming apparatus can perform the function of an image removing device.

In addition, auxiliary image removing means can also be conceivable, for example, an image-bearing recording paper may be impregnated with an organic solvent for the image forming material or with an aqueous or organic solution containing a surfactant or the like that weakens the bond between paper fiber and the image forming material, or otherwise a physical action, for example ultrasonic vibration, may be added to the operation to remove the image forming material.

The present invention will be further clarified by the following examples, which should not be viewed as a limitation on any embodiment of the invention. “Part” in Examples or Comparative Examples means part by weight.

EXAMPLE 1

A flask fitted with stirrer was charged with 16.4 parts of a compound having the following formula (I) as a fluorine-containing compound, 5 parts of a compound having the following formula (II) also as a fluorine-containing compound, 5.6 parts of tetramethoxysilane, 600 parts of isopropyl alcohol as a solvent and 1200 parts of 2-methyl-2-propanol also as a solvent. Next, 2.2 parts of aluminum trisacetylacetate was added, and the reaction mixture was sufficiently stirred. Then, 6.7 parts of 1% aqueous solution of hydrochloric acid was gradually added dropwise to the reaction mixture. After the addition, the mixture was kept at 25° C. for 7 days, and thus a solution was prepared.

$$(CH_3O)_2\underset{|\atop CH_3}{Si}C_2H_4C_8F_{16}C_2H_4\underset{|\atop CH_3}{Si}(OCH_3)_2 \quad (I)$$

$$C_9F_{19}C_2H_4Si(OCH_3)_3 \quad (II)$$

Then, a coating liquid was obtained by admixing the solution prepared in the above with 2 parts of a silanol-modified dimethylsiloxane having a hydroxy group at one end of molecule (XF3968 available from Toshiba Silicone Co., Ltd.) as a modified silicone oil and thereafter with a dispersion which had been prepared by sufficiently dispersing 2.8 parts of titanium oxide (KA-10 having an average particle diameter of 0.4 $\mu$m available from Titan Kogyo Kabushiki Kaisha) as a finely divided material in 200 parts of 2-methyl-2-propanol, and by sufficiently stirring the mixture. The coating liquid was applied by roll to an A4 size paper P for xerography (available from Fuji Xerox Co., Ltd.), which was air-dried for 10 minutes and thereafter oven-dried at 115° C. for 60 minutes to prepare a reusable recording paper. Colored images including letters and solid images were fixed to the surface of the above-described recording paper by means of a color copier (A color 635 available from Fuji Xerox Co., Ltd.) and a continuous copying operation on 1000 sheets of the recording paper was conducted to test the traveling performance of paper.

The fixability of toner was evaluated in the following way. A commercially available cellophane adhesive tape having a breadth of 18 mm (Cellophane Tape available from Nichiban Co., Ltd.) was adhered to a solid image, which had been fixed by use of the above-mentioned color copier and which had a density of about 1.8 as measured by an X-Rite 938 density meter (manufactured by X-Rite Co., Ltd.), by a pressure of 300 g/cm and thereafter peeled at a rate of 10 mm/sec. And, a ratio of the density of the image after peeling to the density of image before peeling (hereinafter referred to as OD ratio) was utilized as an indicator for evaluating the fixability of toner. An electrophotographic recording paper should have a fixability corresponding to an OD ratio of not less than 0.8.

The writability of the reusable recording paper was evaluated by use of an HB pencil (Mitsubishi Uni available from Mitshubishi Pencil Co., Ltd.), a black ball point pen (Fine Letter Super S available from PILOT Co., Ltd.), a water base (fluorescent) pen (OPTEX available from Zebra Co., Ltd.) and an oil base pen (No. 700 available from Magic Ink Co., Ltd.).

The traveling performance of paper in copying operation was evaluated by counting the number of sheets involved in overlap or jam when 1000 sheets of recording paper were fed and by using this number as an indicator. It is desirable that this number should not exceed 2 sheets for a practical electrophotographic recording paper.

When regenerating a recording paper from a paper having a recorded image, a heat roller having a silicone rubber surface layer in the fixing device of the above-mentioned color copier was replaced with a heat roller having an anodized aluminum surface, which was fitted with a metallic blade for scraping the toner released from recording paper. By use of this apparatus, a regenerated, toner-free recording paper could be obtained by merely feeding an image bearing recording paper through the above-described fixing device (by blank copying).

The amount of residual toner on the regenerated paper after the toner removing treatment was evaluated by using an OD ratio as an indicator in the same way as in the case of evaluation of fixability of toner. The surface of the regenerated recording paper should have an OD ratio not greater than 0.08, which indicates a state of image density where the residual toner presents no annoyance.

In order to test the stability in repeated use, the above-described regenerated paper underwent ten cycles, each of which consisted of image recording treatment and image removing treatment. Then, the toner fixability and the amount of residual toner were evaluated. The results are collected in Table 1.

EXAMPLE 2

A coating liquid was obtained by blending 80 parts of methylsilyltriisocyante as an isocyanate silane compound, 8 parts of $\alpha$, $\omega$-dihydroxypolydimethylsiloxane oil (having a viscosity of 2000 cSt at 25° C.) as a silanol-modified silicone oil, 3 parts of dibutylacidphosphate as a curing reaction adjusting agent and 2000 parts of ethyl acetate as a solvent and by adding 14 parts of silicone resin particles (TOSPEARL 130 having an average particle diameter of 3 $\mu$m available from Toshiba Silicone Co., Ltd.) as a finely divided material to the foregoing blend with stirring. The coating liquid was applied by roll to an A4 size paper P for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 1.

EXAMPLE 3

A coating liquid was obtained by blending 60 parts of methylsilyltriisocyante as an isocyanate silane compound, 20 parts of phenylsilyltriisocyante as an isocyanate silane compound, 8 parts of monooctylacidphosphate as a curing reaction adjusting agent, 1400 parts of ethyl acetate and 100 parts of diglyme and by adding 8 parts of benzoguanamine/formaldehyde condensate particles (EPOSTAR MS having an average particle diameter of 2 μm available from Nippon Shokubai Co., Ltd.) as a finely divided material to the foregoing blend with stirring. The coating liquid was applied by roll to an A4 size paper L for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 1.

Comparative Example 1

A coating liquid was obtained by blending 100 parts of a liquid composition containing 2% of a fluorocarbon/acrylic copolymer resin (FC722 available from Sumitomo 3M Limited) and 2 parts of silicone resin particles (TOSPEARL 130 having an average particle diameter of 3 μm available from Toshiba Silicone Co., Ltd.) as a finely divided material. The coating liquid was used in the same way as in Example 1 to prepare an image recording paper. The obtained recording paper was evaluated in the same way as in Example 1 to obtain the results that the writability with pencil was good but the letters by ball point pen were too light and that ink was partially repelled when written with a pen of water or oil base ink. Traveling performance of paper was poor and jam occurred frequently. The fixability of image was also poor and a partial offset phenomenon was observed.

Comparative Example 2

An image recording paper was prepared by repeating the procedure of Example 2 except that 8 parts of an unmodified polydimethylsiloxane oil (KF96 having a viscosity of 2000 cSt at 25° C. available from Shin-Etsu Chemical Co., Ltd.) was used in place of the silanol-modified silicone oil in Example 2. The obtained recording paper was evaluated in the same way as in Example 1 to obtain the results collected in Table 1 indicating that, although the initial properties were good, traveling performance of paper was poor with jam occurring frequently after 500 sheets of copy. This defect was caused presumably by the migration of oil from the recording paper to other material in contact.

Comparative Example 3

An image recording paper was prepared by repeating the procedure of Example 2 except that silicone particles were not used. The obtained recording paper was evaluated in the same way as in Example 1 to obtain the results collected in Table 1 indicating that, although the initial properties were good, the residual toner density exceeded the maximal acceptance OD ratio of 0.08 at the third repetition of reuse.

Comparative Example 4

An image recording paper was prepared by repeating the procedure of Example 2 except that a coating liquid was prepared by blending 20 parts of the finely divided silicone resin and 400 parts of ethyl acetate. The obtained recording paper was evaluated in a same way as in Example 1 to obtain the results collected in Table 1 indicating that the fixability of toner was poor and the release of toner was also poor and that picking up of the recording paper became impossible after feeding about 30 sheets because of poor traveling performance of the recording paper. This defect was caused by the migration of particles from the recording paper to pickup rollers to develop slip of paper between paper and rollers.

EXAMPLE 4

A coating liquid was obtained by a procedure comprising the steps of blending 26.0 parts of $C_{18}H_{37}Si(NCO)_3$ as an isocyanate silane compound and 970 parts of ethyl acetate as a solvent, adding to the foregoing solution 2.6 parts of $C_9F_{19}C_2H_4Si(NCO)_3$ again as an isocyanate silane compound and 1.6 parts of a carboxyl-modified silicone oil (X-22-3710 available from Shin-Etsu Chemical Co., Ltd.) and stirring the resultant blend at 25° C. for one full day, and adding 4 parts of acrylic/styrenic resin particles (MUTICLE 110C having an average particle diameter of 1 μm available from Mitsui Toatsu Chemicals, Inc.) as a finely divided material to the foregoing blend with stirring. The coating liquid was applied to an A4 size fine paper (available from Nippon Paper Industries Co., Ltd.) and treated according to the procedure of Example 2 to prepare a reusable recording paper. The obtained recording paper was evaluated in the same way as in Example 1. And, the results are collected in Table 1.

EXAMPLE 5

A coating liquid was obtained by a procedure comprising the steps of blending 20.0 parts of $C_9F_{19}C_2H_4Si(NCO)_3$ as an isocyanate silane compound and 970 parts of ethyl acetate as a solvent, adding to the foregoing solution 4.6 parts of $(NCO)_3SiC_2H_4C_6F_{12}C_2H_4Si(NCO)_3$ as an isocyanate silane compound, 4.0 parts of $Si(NCO)_4$ again as an isocyanate silane compound, 1.6 parts of a silanol-modified silicone oil (X-22-160AS available from Shin-Etsu Chemical Co., Ltd.), 3.0 parts of monooctylacidphosphate as a curing reaction adjusting agent with stirring and adding 4 parts of silicone resin particles (TOSPEARL 130 having an average particle diameter of 3 μm available from Toshiba Silicone Co., Ltd.) as a finely divided material to the foregoing blend with stirring. The coating liquid was applied to an A4 size recycled PPC paper WR (available from Fuji Xerox Co., Ltd.) and treated according to the procedure of Example 2 to prepare a reusable recording paper. The obtained recording paper was evaluated in the same way as in Example 1. And, the results are collected in Table 1.

EXAMPLE 6

A coating liquid was obtained by a procedure comprising the steps of blending 10.0 parts of $C_{18}H_{37}Si(NCO)_3$ as an isocyanate silane compound and 970 parts of ethyl acetate as a solvent, adding to the foregoing solution 6.0 parts of $C_9F_{19}C_2H_4Si(NCO)_3$ as an isocyanate silane compound 10.0 parts of $C_8H_{17}Si(NCO)_3$ as an isocyanate silane compound, 2.6 parts of methylsilyltriisocyante again as an isocyanate silane compound and 1.6 parts of the aforementioned carboxyl-modified silicone oil and stirring the resultant blend at 25° C. for one full day, and adding 3.5 parts of silicone resin particles (TOSPEARL 105 having an average particle diameter of 0.5 μm available from Toshiba Silicone Co., Ltd.) as a finely divided material to the foregoing blend with stirring. The coating liquid was applied to an A4 size paper J for xerography (available from Fuji Xerox Co., Ltd.) and treated according to the procedure of Example 2 to prepare a reusable recording paper. The obtained recording paper was evaluated in the same way as in Example 1. And, the results are collected in Table 1.

TABLE 1

| | initial | | | | | | | After 10 times repetition of regenerative use | | |
|---|---|---|---|---|---|---|---|---|---|---|
| | | | Writability | | | | | | | |
| | Toner fixability (OD ratio) | After removal of toner (OD ratio) | Pen-cil | Ball point pen | Water-base ink pen | Oil-base ink pen | Traveling perfomance of paper | Toner fixability (OD ratio) | After removal of toner (OD ratio) | Particle diameter (average) ($\mu$m) |
| Ex. 1 | 0.98 | 0.02 | A | A | A | A | 1 | 0.95 | 0.03 | 0.40 |
| Ex. 2 | 0.97 | 0.01 | A | A | A | A | 0 | 0.95 | 0.02 | 3.00 |
| Ex. 3 | 0.94 | 0.03 | A | A | A | A | 0 | 0.94 | 0.03 | 2.00 |
| Comp.Ex. 1 | 0.72 | 0.05 | A | B | B | B | 8 | 0.78 | 0.07 | 3.00 |
| Comp.Ex. 2 | 0.96 | 0.01 | A | A | A | A | 10 | 0.95 | 0.18 | 3.00 |
| Comp.Ex. 3 | 0.98 | 0.07 | A | A | A | A | 1 | 0.95 | 0.33 | — |
| Comp.Ex. 4 | 0.78 | 0.65 | A | A | A | A | — | — | — | 3.00 |
| Ex. 4 | 0.95 | 0.05 | A | A | A | A | 0 | 0.98 | 0.07 | 1.00 |
| Ex. 5 | 0.96 | 0.04 | A | A | A | A | 0 | 0.95 | 0.05 | 3.00 |
| Ex. 6 | 0.94 | 0.02 | A | A | A | A | 0 | 0.93 | 0.03 | 0.50 |

EXAMPLES 7–12

The migration of talc to the surface of a photoreceptor placed inside a copier was examined by use of reusable image recording papers which were based on A4 size fine PPC recording papers (available from Kishu Paper Co., Ltd.) containing a high percentage of talc and which had been treated with the coating liquids prepared in Examples 1–6 according to the respective procedures described in Examples 1–6. A modified copier Vivace 500 (manufactured by Fuji Xerox Co., Ltd.), from which a cleaner system adjacent to the photoreceptor had been removed, was fed with 1000 sheets of the recording papers under a condition of 28° C. and 85% RH to examine the traveling performance of the recording papers. After the passage of the recording papers, the photoreceptor of the above-described modified copier was found to be free of serious fouling and produced image entirely free of defects in comparison with an ordinary copier Vivace 500. Then, a monochrome image including letters and solid image was fixed by use of an ordinary copier Vivace 500. Meanwhile, a heat roller having a silicone rubber surface layer in the fixing device of the copier was replaced with a heat roller having an anodized aluminum surface, which was fitted with a metallic blade for scraping the toner released from recording paper. By use of this apparatus of electrophotography, a toner-free, regenerated recording paper could be obtained by merely feeding an image bearing recording paper through the above-described fixing device (by blank copying). The results are collected in Table 2.

Comparative Example 5

A fine PPC recording paper utilized in Example 7, which had not been treated, was subjected to the same test as in Example 7. The results were that the recording paper could not been regenerated and that a whitish, film-like substance adhered to the surface of the photoreceptor inside the copier. An image by use of this photoreceptor was found to have image drift and none of letters and pictures were discernible. The whitish, film-like substance on the surface of the photoreceptor was found to be talc from the fine PPC recording paper, according to analysis.

TABLE 2

| | initial | | | | | | | After 10 times repetition of regenerative use | | |
|---|---|---|---|---|---|---|---|---|---|---|
| | | | Writability | | | | | | | |
| | Toner fixability (OD ratio) | After removal of toner (OD ratio) | Pen-cil | Ball point pen | Water-base ink pen | Oil-base ink pen | Traveling perfomance of paper | Toner fixability (OD ratio) | After removal of toner (OD ratio) | Particle diameter (average) ($\mu$m) |
| Ex. 7 | 0.98 | 0.01 | A | A | A | A | 1 | 0.98 | 0.02 | 0.40 |
| Ex. 8 | 0.98 | 0.005 | A | A | A | A | 0 | 0.97 | 0.01 | 3.00 |
| Ex. 9 | 0.96 | 0.02 | A | A | A | A | 0 | 0.95 | 0.02 | 2.00 |
| Ex. 10 | 0.98 | 0.02 | A | A | A | A | 0 | 0.97 | 0.02 | 1.0 |
| Ex. 11 | 0.96 | 0.01 | A | A | A | A | 1 | 0.95 | 0.02 | 3.0 |
| Ex. 12 | 0.94 | 0.005 | A | A | A | A | 0 | 0.94 | 0.01 | 0.5 |
| Comp.Ex. 5 | 0.99 | 0.96 | A | A | A | A | 1 | — | — | — |

EXAMPLE 13

A coating liquid was obtained by a procedure comprising the steps of blending 28.0 parts of $Si(NCO)_4$ as an isocyanate silane compound and 970 parts of ethyl acetate as a solvent, adding 28.0 parts of an amino-modified silicone oil (TSF 4702 available from Toshiba Silicone Co., Ltd.) to the foregoing blend with stirring and adding 5 parts of silicone resin particles (TOSPEARL 130 having an average particle diameter of 3 $\mu$m available from Toshiba Silicone Co., Ltd.) as a finely divided material to the foregoing blend with stirring. The coating liquid was applied to an A4 size recycled PPC paper WR (available from Fuji Xerox Co., Ltd.) and treated according to the procedure of Example 2 to prepare a reusable recording paper. The obtained recording paper was evaluated in the same way as in Example 1. And, the results are collected in Table 3.

EXAMPLE 14

A coating liquid was obtained by a procedure comprising the steps of blending 14.0 parts of $Si(NCO)_4$ as an isocyanate silane compound and 970 parts of ethyl acetate as a solvent, adding to the foregoing blend 14.0 parts of $CH_3Si(OCH_3)_3$ as an alkoxy silane compound and 5 parts of a methylhydrogensilicone oil (KF99 available from Shin-Etsu Chemical Co., Ltd.) and stirring the resultant blend at 25° C. for one full day, and adding 3.5 parts of silicone resin particles (TOSPEARL 105 having an average particle diameter of 0.5 μm available from Toshiba Silicone Co., Ltd.) as a finely divided material to the foregoing blend with stirring. The coating liquid was applied to an A4 size paper L for xerography (available from Fuji Xerox Co., Ltd.) and treated according to the procedure of Example 2 to prepare a reusable recording paper. The obtained recording paper was evaluated in the same way as in Example 1. And, the results are collected in Table 3.

EXAMPLE 15

A coating liquid was obtained by blending 25 parts of $CH_3Si(OCH_3)_3$ as an alkoxy silane compound, 50.0 parts of an amino-modified silicone oil (TSF 4702 available from Toshiba Silicone Co., Ltd.) and 2000 parts of ethyl acetate as a solvent and by adding 14 parts of silicone resin particles (TOSPEARL 130 having an average particle diameter of 3 μm available from Toshiba Silicone Co., Ltd.) as a finely divided material to the foregoing blend with stirring. The coating liquid was applied by roll to an A4 size paper P for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 3.

EXAMPLE 16

A coating liquid was obtained by blending 20 parts of methylsilyltriisocyante as an isocyanate silane compound, 60 parts of trimethoxyvinylsilane as a silane coupling agent, 80 parts of the aforementioned amino-modified silicone oil and 1400 parts of ethyl acetate and by adding 10 parts of benzoguanamine/formaldehyde condensate particles (EPOSTAR MS having an average particle diameter of 2 μm available from Nippon Shokubai Co., Ltd.) as a finely divided material to the foregoing blend with stirring. The coating liquid was applied by roll to an A4 size paper J for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 3.

EXAMPLE 17

A coating liquid was obtained by a procedure comprising the steps of blending 10.0 parts of $CH_3Si(NCO)_3$ as an isocyanate silane compound and 970 parts of ethyl acetate as a solvent, adding to the foregoing blend 10.0 parts of $CH_3HSi(OCH_3)_2$ as a SiH-bearing compound and 8.0 parts of a carboxyl-modified silicone oil (X-22-3710 available from Shin-Etsu Chemical Co., Ltd.) and stirring the resultant blend at 25° C. for one full day, and adding 4 parts of acrylic/styrenic resin particles (MUTICLE 110C having an average particle diameter of 1 μm available from Mitsui Toatsu Chemicals, Inc.) as a finely divided material to the foregoing blend with stirring. The coating liquid was applied to an A4 size fine paper (available from Nippon Paper Industries Co., Ltd.) and treated according to the procedure of Example 2 to prepare a reusable recording paper. The obtained recording paper was evaluated in the same way as in Example 1. And, the results are collected in Table 3.

EXAMPLE 18

A coating liquid was obtained by a procedure comprising the steps of blending 15.0 parts of N-phenyl-γ-aminopropyltrimethoxysilane as a silane coupling agent and 970 parts of ethyl acetate as a solvent, adding 28.0 parts of an amino-modified silicone oil (TSF 4702 available from Toshiba Silicone Co., Ltd.) to the foregoing blend with stirring and adding 5 parts of silicone resin particles (TOSPEARL 145 having an average particle diameter of 4.5 μm available from Toshiba Silicone Co., Ltd.) as a finely divided material to the foregoing blend with stirring. The coating liquid was applied to an A4 size recycled PPC paper WR (available from Fuji Xerox Co., Ltd.) and treated according to the procedure of Example 2 to prepare a reusable recording paper. The obtained recording paper was evaluated in the same way as in Example 1. And, the results are collected in Table 3.

EXAMPLE 19

A coating liquid was obtained by a procedure comprising the steps of blending 20.0 parts of γ-methacryloxypropyltrimethoxysilane as a silane coupling agent and 970 parts of ethyl acetate as a solvent, adding to the foregoing blend 14.0 parts of $CH_3Si(OCH_3)_3$ as an alkoxy silane compound and 20.0 parts of a methylhydrogensilicone oil (KF99 available from Shin-Etsu Chemical Co., Ltd.) and 10.0 parts of an amino-modified silicone oil (TSF 4702 available from Toshiba Silicone Co., Ltd.) and stirring the resultant blend at 25° C. for one full day, and adding 5.5 parts of benzoguanamine/formaldehyde condensate particles (EPOSTAR MS having an average particle diameter of 2 μm available from Nippon Shokubai Co., Ltd.) as a finely divided material to the foregoing blend with stirring. The coating liquid was applied to an A4 size paper L for xerography (available from Fuji Xerox Co., Ltd.) and treated according to the procedure of Example 2 to prepare a reusable recording paper. The obtained recording paper was evaluated in the same way as in Example 1. And, the results are collected in Table 3.

EXAMPLE 20

A coating liquid was obtained by blending 25.0 parts of $CH_3Si(OCH_3)_3$ as an alkoxy silane compound, 50.0 parts of an amino-modified silicone oil (TSF 4702 available from Toshiba Silicone Co., Ltd.) and 2000 parts of ethyl acetate as a solvent and by adding 7.2 parts of silicone resin particles (TOSPEARL 130 having an average particle diameter of 3 μm available from Toshiba Silicone Co., Ltd.) as a finely divided material and 2.8 parts of titanium oxide (KA-10 having an average particle diameter of 0.4 μm available from Titan Kogyo K.K) as a finely divided material to the foregoing blend with stirring. The coating liquid was applied by roll to an A4 size paper P for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 3.

EXAMPLE 21

A coating liquid was obtained by blending 20 parts of methylsilyltriisocyante as an isocyanate silane compound, 30 parts of γ-glycidoxypropyltrimethoxysilane as a silane coupling agent, 50 parts of the aforementioned amino-modified silicone oil and 1400 parts of ethyl acetate and by adding 10 parts of benzoguanamine/formaldehyde condensate particles (EPOSTAR MS having an average particle diameter of 2 μm available from Nippon Shokubai Co., Ltd.) as a finely divided material to the foregoing blend with stirring. The coating liquid was applied by roll to an A4 size paper J for xerography (available from Fuji Xerox Co., Ltd.), which was air-dried for 5 minutes and thereafter oven-dried at 115° C. for 20 seconds to prepare a reusable recording paper. The obtained recording paper was evaluated in the same way as in Example 1. And, the results are collected in Table 3.

What is claimed is:

1. A reusable image recording paper having a recording surface comprised of a film obtained by a process comprising coating or impregnating a substrate comprised primarily of a pulp fiber with a liquid composition consisting essentially of a silicone compound, a finely divided material, and, optionally, a modified silicone oil comprising a reactive group, wherein said silicone compound is capable of combining with the substrate and with the finely divided material by a chemical reaction, and drying the coated or impregnated liquid composition, wherein in said process said silicone compound chemically reacts with said substrate.

2. The image recording paper of claim 1 wherein the liquid composition contains said modified silicone oil comprising a reactive group.

3. The image recording paper of claim 2 wherein the modified silicone oil comprising a reactive group comprises at least one modified silicone oil selected from the group consisting of a silanol-modified silicone oil, a carboxyl-modified silicone oil, an amino-modified silicone oil and a methylhydrogensilicone oil.

4. The image recording paper of claim 2 wherein the modified silicone oil comprising a reactive group is an epoxy-modified silicone oil, a carbinol-modified silicone oil, a methacryl-modified silicone oil, a mercapto-modified silicone oil or a phenol-modified silicone oil.

5. The image recording paper of claim 2 wherein the modified silicone oil comprises two reactive groups, each of said reactive groups being different from the other.

6. The image recording paper of claim 5 wherein the modified silicone oil comprises an amino group and an alkoxy group.

7. The image recording paper of claim 2 wherein the amount of the modified silicone oil is 1–400% by weight based on the weight of the silicone compound.

8. The image recording paper of claim 1 wherein the silicone compound comprises at least one compound selected from the group consisting of a fluorine-containing silicone compound, an isocyanate silane compound, an alkoxysilane compound, a silane coupling agent, and a SiH-bearing silane compound.

9. The image recording paper of claim 8 wherein the fluorine-containing silicone compound is a fluorine-containing compound having a perfluoroalkyl group.

10. The image recording paper of claim 9 wherein the fluorine-containing compound having a perfluoroalkyl group has three or more functional groups which are a methoxy group or an isocyanate group.

TABLE 3

| | initial | | | | | | | After 10 times repetition of regenerative use | | |
|---|---|---|---|---|---|---|---|---|---|---|
| | | | Writability | | | | | | | |
| | Toner fixability (OD ratio) | After removal of toner (OD ratio) | Pencil | Ball point pen | Water-base ink pen | Oil-base ink pen | Traveling perfomance of paper | Toner fixability (OD ratio) | After removal of toner (OD ratio) | Particle diameter (average) (μm) |
| Ex. 13 | 0.97 | 0.04 | A | A | A | A | 0 | 0.95 | 0.06 | 3.00 |
| Ex. 14 | 0.97 | 0.02 | A | A | A | A | 1 | 0.97 | 0.03 | 0.50 |
| Ex. 15 | 0.97 | 0.02 | A | A | A | A | 0 | 0.95 | 0.03 | 3.00 |
| Ex. 16 | 0.96 | 0.04 | A | A | A | A | 0 | 0.95 | 0.06 | 2.00 |
| Ex. 17 | 0.98 | 0.01 | A | A | A | A | 1 | 0.97 | 0.02 | 1.00 |
| Ex. 18 | 0.97 | 0.04 | A | A | A | A | 1 | 0.95 | 0.05 | 4.50 |
| Ex. 19 | 0.95 | 0.05 | A | A | A | A | 1 | 0.93 | 0.05 | 2.00 |
| Ex. 20 | 0.98 | 0.04 | A | A | A | A | 0 | 0.96 | 0.04 | 3.00 |
| Ex. 21 | 0.96 | 0.02 | A | A | A | A | 0 | 0.94 | 0.05 | 2.00 |

As stated above, the image recording paper of the present invention makes two properties, namely, fixation and release of image forming material, which conflict with each other and have been hitherto impossible to obtain at the same time, compatible with each other without altering the appearance of plain paper. In addition, the case where the reuse is possible is not limited to a monochrome image copy and includes colored image copy or even a full solid image. A further advantage of the recording paper of the present invention is that it imparts no deleterious influence to any member which comes into contact with it because a silicone ingredient on the substrate does not migrate and secures the constituents of the recording paper into the paper and that the stability in repeating a cycle consisting of image formation and erasure of image is excellent.

Furthermore, because of regenerative use, expected effects include an economical advantage that the cost of paper per copy is reduced and an environmental advantage on a global scale that consumption of paper resources is reduced and reduction in $CO_2$ emission (prevention of global warming) is possible.

11. The image recording paper of claim 8 wherein the isocyanate silane compound has three or more functional groups which are an isocyanate group.

12. The image recording paper of claim 8 wherein the alkoxy silane compound has three or more functional groups which are an alkoxy group.

13. The image recording paper of claim 8 wherein the silane coupling agent includes at least one compound selected from the group consisting of a vinyl silane, an acrylic silane, an epoxy silane and an amino silane.

14. The image recording paper of claim 1 wherein the content of the finely divided material is 1–100 parts by weight based on 100 parts by weight of the silicone compound.

15. The image recording paper of claim 1 wherein the average diameter of the finely divided material is 0.1–15 μm.

16. The image recording paper of claim 1 wherein the finely divided material is a finely divided inorganic material.

17. The image recording paper of claim 1 wherein the finely divided material is a finely divided resin.

18. The image recording paper of claim 17 wherein the finely divided resin is a finely divided silicone resin.

19. The image recording paper of claim 1 wherein the film has a thickness of 0.05–5.0 μm exclusive of the finely divided material.

* * * * *